March 9, 1937. G. J. LIDDELL ET AL 2,073,243
FUEL SYSTEM TESTING INSTRUMENT
Filed July 3, 1935
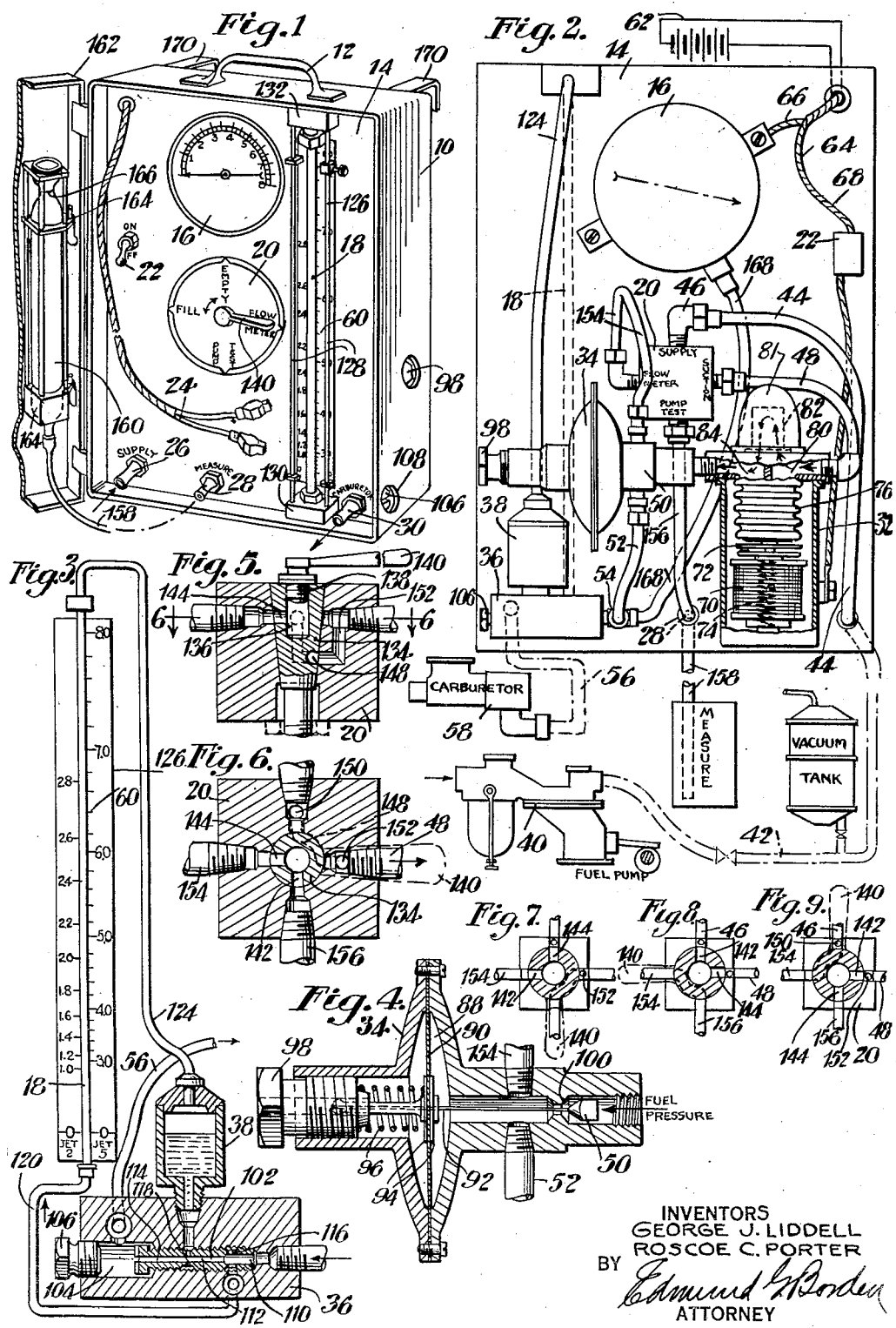
INVENTORS
GEORGE J. LIDDELL
ROSCOE C. PORTER
BY
Edmund G Borden
ATTORNEY Patented Mar. 9, 1937

2,073,243

UNITED STATES PATENT OFFICE 2,073,243

FUEL SYSTEM TESTING INSTRUMENT

George J. Liddell, Elmhurst, and Roscoe C. Porter, Long Island City, N. Y., assignors to Doherty Research Company, New York, N. Y., a corporation of Delaware Application July 3, 1935, Serial No. 29,742

6 Claims. (Cl. 73—51)

This invention relates to an instrument for testing the different portions of a fuel system by which motor fuel is supplied to an automotive engine.

One of the essential features of an automotive engine, particularly an automobile or truck, is an efficient fuel feeding system. The fuel feeding system, particularly when handling gasoline, must have a means for positively feeding the gasoline from a supply to a carburetor where the gasoline is carbureted with air and passed into the cylinders. If the fuel system is tight and functions properly, adjustments of the carburetor and timing mechanism will usually give a maximum fuel efficiency. If there are leaks in the fuel system, however, there will be a wastage of motor fuel both while the car is standing idle and while it is in operation.

The present invention provides an instrument by which all parts of the fuel system may be carefully tested and the rate of flow of fuel to the engine accurately measured to provide for the maximum efficiency in the use of fuel in the engine.

One object of the invention is to provide an instrument by which the rate of flow of fuel to the engine may be accurately measured. This measurement may be made whether the automobile is stationary, while the engine is running or while the engine is in operation to carry the automobile over the road.

Another object of the invention is to provide an instrument for measuring the rate of flow of fuel to an automobile engine while the engine is propelling a vehicle at different rates of speed or pulling different loads while operating on a road.

Another object of the invention is to provide an instrument for measuring the fuel feed pressure when a forced feed fuel system is employed. This measurement of the pressure may be made while the engine is running or when it is operating in an automobile upon the road.

A further object of the invention is to provide an instrument for checking the fuel feeding system for leakage in joints and valves.

With these and other objects in view the invention consists in the improved instrument for testing fuel systems hereinafter described and particularly defined in the claims.

The various features of the invention are illustrated in the accompanying drawing in which:

Fig. 1 is a perspective view in front elevation showing the front of the instrument panel;

Fig. 2 is a diagrammatic view in rear elevation showing the assembly of the various parts on the rear of the instrument panel. In dot and dash lines are illustrated the connections of the various parts of the feeding system for use with the testing instrument;

Fig. 3 is a view in elevation with parts shown in section of the measuring orifices of the differential measuring gauge;

Fig. 4 is a vertical sectional view of a pressure regulator used in the testing instrument;

Fig. 5 is a horizontal sectional view of a multiple flow control valve used in the instrument;

Fig. 6 is a sectional view of the control valve as taken on the line 6—6 of Fig. 5;

Figs. 7, 8, and 9 are diagrammatic views of the control valve showing the valve setting for making different tests in the fuel system.

The flow meter illustrated in the drawing is embodied in a portable instrument such that a mechanic may carry it from place to place through a garage or to any point where the rate of flow is to be determined. The instrument is mounted in a casing 10 which has the dimensions of about 12" high, 9" wide and 5" deep. A handle 12 is secured to the top of the case by which the instrument may be readily carried. The parts of the instrument are mounted upon a panel 14 which in turn is secured within the casing. The panel is preferably mounted close to the front side or door of the casing and when the door of the casing is closed all parts of the instrument are enclosed within the casing. On the front face of the panel are mounted a pressure gauge 16, a differential pressure indicator 18, a control valve 20, electric switch 22, and a pair of lead wires 24 having clamps for connection with the usual battery electrical circuit. At the bottom of the front side of the panel are secured three nozzles 26, 28, and 30 by which connections may be made to the fuel system to be tested.

On the rear of the panel 14 (Fig. 2) is mounted the testing equipment which includes a pump 32, the control valve 20, a pressure regulator 34, an orifice meter block 36, a capacity chamber 38 of the differential orifice pressure indicating mechanism and the pressure gauge 16. In Fig. 2 is shown diagrammatically the connections between the flow measuring instrument and some of the usual instrumentalities embodied in a fuel system of the ordinary automobile. For example the automobile fuel pump is indicated at 40 which may be used supplying gasoline from the automobile supply tank through a line 42 to a line 44 mounted on the rear of the panel. The line 42 shown in dot and dash lines is preferably of flexible tubing and makes a connection with the supply nozzle 26 mounted on the front of the panel. The gasoline flowing through the lines 42 and 44 passes to an inlet connection 46 mounted in the block of the control valve 20. With the control valve mounted in the position illustrated in Fig. 1 wherein the handle of the valve points to the words "Flow meter" the gasoline supplied from the pump will pass into the valve block 20, pass through the block 20 and out through a line 48 connected with the pump 32. The gasoline will pass through the pump 32 and through a control valve 50 mounted in the pressure regulator 34 (see Fig. 4). From the pressure regulator the gasoline will flow through an outlet line 52, Figs. 2 and 4, to a T 54 connected to the orifice block 36. Gasoline passing through the orifice block will emerge through the carbureter nozzle 30 at the front of the panel from whence the gasoline will be conducted through a line 56 to a carbureter 58 of the automobile. The line 56 is preferably made of flexible tubing which can be used for test purposes. As the gasoline passes through the orifice block the rate of flow of the gasoline will be indicated on a small bore indicating tube 18, Fig. 1, in front of a scale 60 which is calibrated to read directly in rates of flow.

The pump 32 which is used for controlling the flow of gasoline through the instrument is illustrated in the drawing as being a magnetically operated pump of the type which is manufactured and sold by the Auto Pulse Corporation, this pump being a standard pump on the market. The pump is preferably operated from a 6-volt battery circuit illustrated at 62, Fig. 2. The battery circuit includes a cable 64, one line 66 passing to ground, the other line 68 passing through the switch 22. When the battery circuit is closed a current will flow through a magnetized coil 70 which will act to attract an armature 72. As the armature is drawn down toward the coil a contact switch will be moved into a position to break the battery circuit and a compression spring 74 will act to force the armature upwardly. The up and down movement of the armature operates a bellows 76. This bellows movement draws in gasoline from the line 48 when the bellows is pulled downwardly by the armature 72 and pumps the gasoline from an inlet chamber 80 outwardly to a sight chamber 81 thence through a screen 82 to an outlet chamber 84. Upon the upward stroke of the bellows caused by the spring 74, gasoline is forced from the chamber 80 to the chamber 84 and through a line to the pressure regulating valve 50. When a predetermined pressure has been developed on the gasoline passing through the pump the action of the spring 74 will be automatically overcome to stop the action of the pump until the pressure on the gasoline is relieved. At such time the spring will automatically start the pump to operate and it will continue to operate so long as there is a demand for further gasoline.

The pump illustrated and described herein does not form a part of the invention, but is merely shown as an instrumentality by which gasoline or any fuel or fluid to be tested may be positively controlled and supplied to the measuring mechanism. In some automobiles the gasoline is fed under pressure by a pump. In other automobiles a gravity feed is employed, while in many automobiles the gasoline is supplied by a vacuum system. The pump 32 illustrated in the drawing will take the fuel from any of these feed systems and positively supply it to the measuring device.

The pressure regulator illustrated in the drawing performs an important function in operation of the instrument. When the instrument is to be used for testing the fuel system of an automotive engine it is preferably adjusted to supply the fuel to the carbureter at the preferred pressure which is used in the normal operation of the car. In most pressure-feed systems about a 2-pound pressure is employed. The pressure regulator 34 (Fig. 4) consists of a diaphragm chamber 88 in which is mounted a diaphragm 90. To the diaphragm 90 is secured the stem 92 of the valve 50. The stem 92 is preferably secured to the diaphragm by a series of plates 94 and extends rearwardly from the diaphragm and is surrounded by a control spring 96. An adjusting nut 98 is mounted in the diaphragm casing by which the position or setting of the valve may be accurately controlled, this nut bearing upon the spring 96 and acting to adjust the compression of the spring which in turn bears against the diaphragm. The valve 50 plays against a valve seat 100 in throttling the flow of gasoline through the regulator. The adjustment of the nut 98 will allow any predetermined pressure to be maintained on the gasoline or fuel leaving the regulator valve through the line 52. The regulator 34 is preferably mounted in the panel 14 in such a position that the adjusting nut 98, Figs. 1 and 2, extends out to the casing and an opening is provided in the casing so that the pressure on the spring 96 may be adjusted from the outside of the casing in calibrating and testing the machine.

The method of measuring the flow of fuel with the instrument is based upon a measurement of the differential pressure on opposite sides of an orifice through which the fuel is flowing. In order therefore to maintain a proper adjustment and calibration of the flow measuring differential pressure mechanism it is very important that a uniform pressure on the fuel being measured shall be maintained. The pressure regulator 34 has been found to be very effective in maintaining this predetermined pressure and preferably the pressure is that pressure which is normally used in automobile practice.

The orifice meter embodied in the invention is shown more particularly in Fig. 3. The meter consists of a block 36 in which is mounted a multiple stage orifice member 102. The orifice member 102 is provided with an external thread by which it can be mounted without leakage in a threaded opening in the block. The orifice member 102 is preferably removably mounted in the block in order that different types or sizes of orifice members may be used. This is quite important because the ordinary automobile uses carbureters of one size that provide for a normal flow for an automobile, while other automotive equipment such as trucks and buses use a much larger carbureter and burn much more gasoline per unit of time. Therefore orifice members having different sizes of orifices are provided to take care of the different fuel feeding systems to be tested. The outlet side of the orifice block is preferably provided with an enlarged chamber 104 which is closed normally by a plug screw 106. The orifice block is mounted in the casing close to one side of the casing so that the screw 106 is mounted adjacent an opening 108 in the side of the casing (see Fig. 1). By removing the plug nut 106 different orifices may be readily inserted into the orifice block without removing the panel 14 from the casing.

The orifice member 102 (Fig. 3) consists of a series of orifices 110, 112, and 114 which are connected in series. Between the orifices are mounted openings 116, and 118 which pass through and separate one orifice from the other one. To the opening 116 is connected a tube 120 which in turn is connected with the small bore measuring tube 18. The opening 118 is connected with a capacity chamber 38. The capacity chamber is connected by means of a tube 124 with the upper end of the small bore tube 18. The tube 120 connects with the high pressure side of the orifice 112 and the capacity chamber 38 connects with the low pressure side of the orifice. When there is no flow through the orifices and the system is under pressure the fluid in the small bore tube and in the upper portion of the capacity chamber should preferably stand at the same level. The flow indicating chart 60 has a zero indication thereon which zero position preferably is adjusted to correspond to the meniscus of the fluid in the small bore tube 18 at the position of no-flow. In order to provide this adjustment, the scale 60 is mounted on a plate 126 that is slidably mounted on guide rods 128 which in turn are mounted in blocks 130 and 132 secured to the inner side of the casing 10, see Fig. 1. The compression of the gas in the upper portion of the capacity chamber 38 and the small bore tube is carefully calibrated for the pressure at which the gasoline or fuel is supplied to the orifice meter so that the indication or movement of the fuel in the small bore tube under different rates of flow will be an accurate indication of the rates of flow based upon the supply of the gasoline to the orifices at a uniform pressure.

The pressure of two pounds which is usually supplied in the feed lines of an automobile is a comparatively high pressure to impress upon a small bore tube of the type shown in the drawing because this tube is comparatively short and small in diameter. Accordingly the multiple arrangement of the orifice is provided whereby an orifice pressure differential may be utilized that will give accurate measurements with a comparatively short small bore tube. It is desirable in an instrument of this type to have a small bore tube less than 24" long. As the gasoline passes through the multiple orifice member the greatest amount of the pressure drop through the orifice occurs in the first section 110 of the orifice member. The orifice pressure differential across the section 112 is considerably lower than the orifice pressure differential across the orifice 110. The differential pressure across the orifice 112 is used for indicating the flow in the present invention. The flow through the orifice 112 is directly related to the flow through the entire orifice and therefore the differential pressure through the orifice section 112 is carefully calibrated to accurately indicate the flow through the orifice block. It is desirable to have a small bore tube less than twenty-four inches long.

The details of construction of control valve 20 are illustrated in Figs. 5 and 6. The valve consists of a conical valve plug mounted in the block 20. The valve plug 134 has a central opening 136 which is closed by a nut 138 secured to an indicating handle 140 used for rotating the plug in the block. Radial openings 142 and 144 are formed in the plug near its upper end in position to register with four openings formed in the valve block 20, in order to direct the flow in different directions as the plug is rotated in the block. Near the lower end of the plug is an opening 146, Figs. 5 and 6, which extends around a quarter of the periphery of the plug. When the plug is in the position shown in Fig. 6, the peripheral opening 146 will register with openings 150 and 152 formed in the block so that fluid can pass downwardly through the opening 150 around through the peripheral opening 148 and up through the opening 152. This position is illustrated in Figs. 5 and 6, and is the only position in which opening 148 is operative.

With the valve 20 in the position shown in Figs. 5 and 6 and the pump 32 in operation, the valve handle being placed to point to the word "Fill" (illustrated in Fig. 1), gasoline is drawn from a source of supply which may be fuel pump or a vacuum tank and passed up through the line 44 to the valve block 20 down therethrough the opening 150, through openings 148 and 152 to line 48, thence through the pump to the regulating valve 34. From the regulating valve 34 the fuel passes upwardly through a line 154, Figs. 2 and 4, thence through the plug valve and out through a line 156, Figs. 2 and 6, leading to the nipple 28 on the front of a panel and thence to any measuring or containing device to receive the fuel. By this means the fuel may be removed from the supply tank or other source of supply and put into a measuring container to be later used for checking the operation of the car and the calibration of the flow measuring instrument. A line 158, Fig. 2, which is preferably a flexible tube would be connected with the nozzle 28 to lead the fuel from the nozzle to the measuring device to receive the fuel.

A measuring device is diagrammatically indicated in Fig. 2 and is shown in another form at the left hand side of Fig. 1. This measuring device consists of a pipette 160 which is mounted on the cover 162 for the casing. The pipette is enclosed in a frame 164 which is removably attached to the cover. The pipette may be filled from the tube 158 up to an indicating calibrated point 166 on the pipette. The valve controlling handle would then be moved into the vertical position illustrated in Fig. 9 and opposite the word "Empty" on the panel as illustrated in Fig. 1. The pump 32 would then draw gasoline or fuel from the pipette through the line 156 into orifice 144 and the plug and out through orifice 142 to the line 48 leading to the pump 32. From the pump gasoline would go through the pressure regulator then down through the line 52 to the orifice block 36 and thence through line 56 to the carbureter 58. The removal of fuel from the pipette would be timed by a stop watch to measure the flow rate and at the same time the indication on the chart 60 would be watched to check the flow from the measuring pipette against the flow as indicated on the differential pressure mechanism. By this means the calibration of the instrument may be carefully checked. This same apparatus may be used while the car is in operation whereby a measured quantity of fuel may be used for supplying the fuel to the carburetor while the engine is in operation to check the mileage of the car while the automobile is in operation on the road.

The position of the control valve 20 for testing the normal rate of flow through the fuel system when drawing the supply of fuel from the supply tank is illustrated in Fig. 8. In this position the handle 140 of the plug valve is moved into the position illustrated in Fig. 1 immediately above the words "Flow meter". In this position the gasoline comes from the source of supply through the line 44 into the plug valve through the orifice 142 and out through the orifice 144 to the line 48. Thence the gasoline passes through the pump 32, regulator valve 34, line 52 and orifice block 36 to the carburetor. At this time the lines 154 and 156 are closed by the plug valve. The flow of fuel through the orifice plug 36 is indicated directly on the differential indicating scale 60.

The position of the control valve 20 for testing the pressure of the fuel in the feed system of a car which is normally provided with a fuel pressure pump is indicated in Fig. 7. In this position the handle 140 of the valve is moved downwardly as indicated in dot and dash line on Fig. 7 and opposite the words "Pump test" shown in Fig. 1. With the valve in this position the fuel from the pump 40 flows through the lines 42 and 44 to the valve 20, thence through the orifice 144 and out through the orifice 142 to the line 154. The fuel then passes through a chamber in the pressure regulator to the line 52 and down to the orifice block 36. A line 168 is connected to the T 54 mounted in the orifice block, this line passing from the T to the pressure gauge 16. At such time the pump 32 would not be in operation and the full pressure of the pump 40 would be impressed through the line just described and up to the gauge.

A pair of hooks 170, Fig. 1, are mounted on the back side of the casing 10 by which the instrument may be secured to various parts of a car or other devices to support the instrument while it is being used.

With the instrument illustrated and described herein it will be seen that many tests may be made on the fuel system of an automobile engine. For example, the fuel pump pressure may be checked. Furthermore the feed line may be placed under pressure when the valve is set in the position illustrated in Fig. 8. If the car is standing idle and not consuming fuel at this time the leakage of the valves in the carburetor may be immediately checked to see whether gasoline flows when the engine is not in operation. Furthermore if there are any leaks in the entire fuel conducting system these leaks will be detected through the carburetor or on the outside of the conducting lines. Furthermore the normal level of the fuel in the carburetor may be checked to see whether or not the float valves are properly functioning. When the car is running either on the floor or on the road the fuel consumption may be continuously checked and measured. Furthermore the accuracy of the flow meter reading may be checked by means of a calibrated measured quantity of gasoline and means are provided by which different kinds of fuel may be used in a car by drawing fuel from different sources of supply and measuring the flow rate and the rate of consumption of such fuels.

Another distinctive feature of the construction illustrated in the drawing is the provision of a diaphragm pressure regulator and a capacity chamber by which a steady uniform reading may be obtained. The pulsation of the pumps is absorbed by the flexible diaphragm and the body of gas in the capacity chamber of the flow meter so that the pulsation is not imparted to the level of the liquid in the small bore tube 18 and thus accurate readings may be obtained. Furthermore the accuracy of the pressure regulator may be checked at all times from the pressure gauge to see that the flow meter is operating at the required pressure.

The preferred form of the invention having been thus described what is claimed as new is:

1. A flow meter for a fuel system of an automotive engine comprising a pump connected with a source of fuel supply, a diaphragm pressure regulator connected with the pump arranged to maintain a predetermined pressure of several pounds on the fuel passing therethrough, an orifice block having a series of connected orifices therethrough connected with the adjusted pressure side of the regulator, a differential pressure measuring mechanism, connections at opposite sides of one of the intermediate orifices secured to the mechanism, and a scale on said mechanism for indicating directly the liquid flow rate through said orifices.

2. A flow meter for the fuel system of an automotive engine comprising a pump operable independently of the engine connected with a source of fuel supply, a pressure regulator connected with the pump and arranged to maintain a predetermined pressure on the fuel passing therethrough, a differential measuring mechanism including an orifice member connected with the constant pressure outlet side of said regulator, a scale associated with said mechanism for reading directly the flow rates through said orifice and a multiple-flow control valve in the line leading from the fuel supply to the pump and having a connection direct with the inlet of the orifice.

3. A flow meter for the fuel system of an automotive engine comprising a pump connected with a source of fuel supply, a pressure regulator connected with the pump arranged to maintain a predetermined pressure of the fuel passing therethrough, an orifice block having a series of connected orifices therethrough connected with the adjusted pressure side of the regulator, a differential gauge having a capacity chamber connected with the low pressure side of an intermediate orifice in said block, a small bore tube connected with the high pressure side of said intermediate orifice, said capacity chamber and small bore tube being connected to form said differential gauge, and a scale calibrated in flow rates adjustably mounted adjacent said capillary tube, the outlet side of the orifice block being connected to a carburetor.

4. A flow meter for the fuel system of an automotive engine comprising means operable independently of the engine for supplying fuel under pressure connected with a source of fuel supply, an orifice member having a series of connected orifices therethrough connected with the supply means, a pressure regulator for maintaining a constant pressure of approximately two pounds at the inlet of the orifice member, a differential pressure measuring mechanism connected at opposite sides of an intermediate orifice of the orifice member and including a small bore tube connected with the high pressure side of the orifice which has a length of not more than twenty-four inches.

5. A flow meter for checking the fuel feeding system of an automotive engine comprising a pump operable independently of the engine for feeding fuel to the system from a source of supply under pressure, a pressure-regulator connected to the discharge of said pump and arranged to maintain a predetermined pressure on fuel passing therethrough, a differential flow meter including a flow measuring orifice connected to the discharge of said regulator, a connection between the discharge side of said orifice and a carbureter for said engine, a pressure gauge, a connection between the inlet side of the orifice and the pressure gauge, a measuring pipette, and a multiple flow control valve comprising a plurality of valve-controlled passages each arranged for valve connection to one of the other passages, together with a connection between one of said passages and the source of fuel supply, a second connection between an adjacent passage and the pump, another connection between one of said passages and the inlet of the flow measuring orifice, and a fourth connection between one of said passages and the measuring pipette.

6. A flow meter for the fuel system of an automotive engine comprising, means for supplying fuel under pressure, a pressure regulator arranged to maintain a predetermined pressure on fuel passing therethrough, a differential flow meter including a flow measuring orifice, a connection between the discharge side of said orifice and a carbureter for said engine, a pressure gauge, a connection between the inlet side of said orifice and the pressure gauge, a measuring pipette, and a multiple flow control valve comprising a rotatable plug having a central aperture and two radial orifices ported out in said aperture at a 90° angle in the same plane, said plug also having a peripheral groove located in a plane spaced from that of the orifices and having its ends spaced at 90° angles respectively from each other and from the adjacent radial orifices, together with a centrally apertured valve block in which said plug is journaled, said block having four radial passages spaced at 90° angles and all located in the plane of the radial orifices in the plug, two additional passages in said block adapted to communicably connect two of the adjacent radial passages with the peripheral groove in the plug at one position of the plug; a connection between one of the radial passages and the fuel supply means, a connection between an adjacent radial passage and the inlet side of the pressure regulator, a connection between the discharge side of the pressure regulator and the inlet of the flow measuring orifice, a connection between the discharge side of the pressure regulator and another of the radial passages, and a connection between the fourth radial passage and the measuring pipette.

GEORGE J. LIDDELL.
ROSCOE C. PORTER.